Patented Dec. 23, 1941

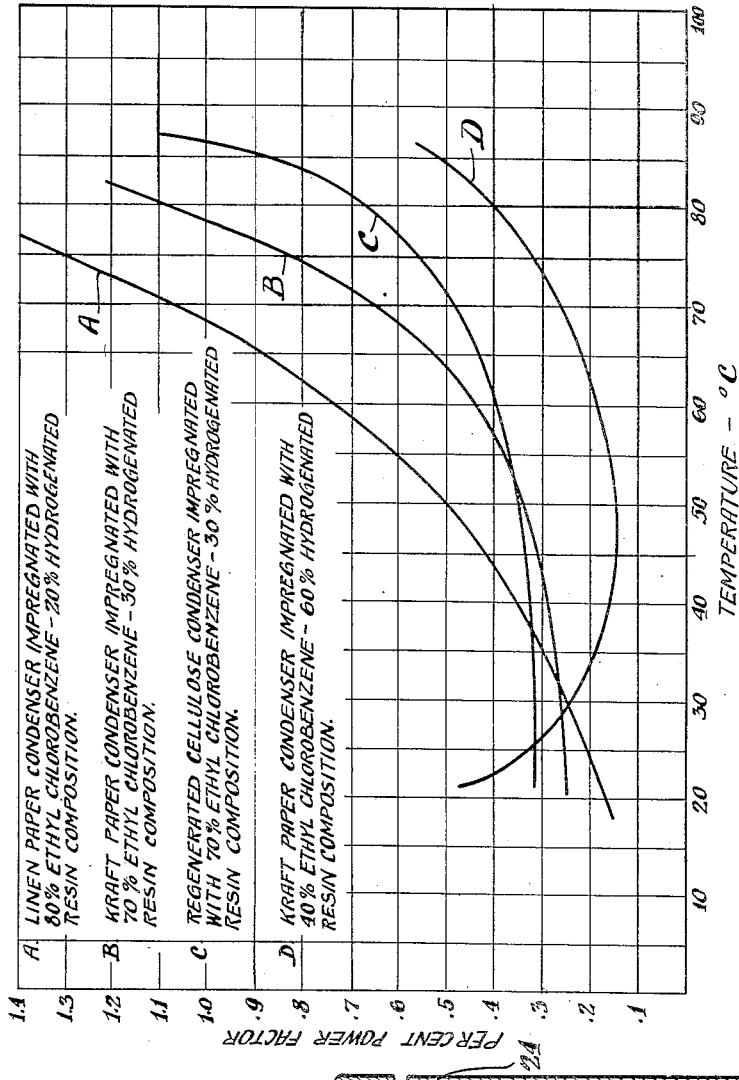
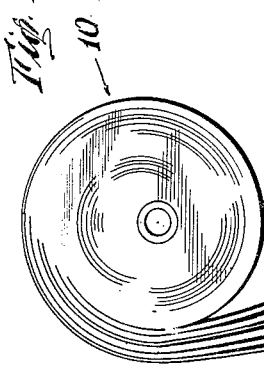
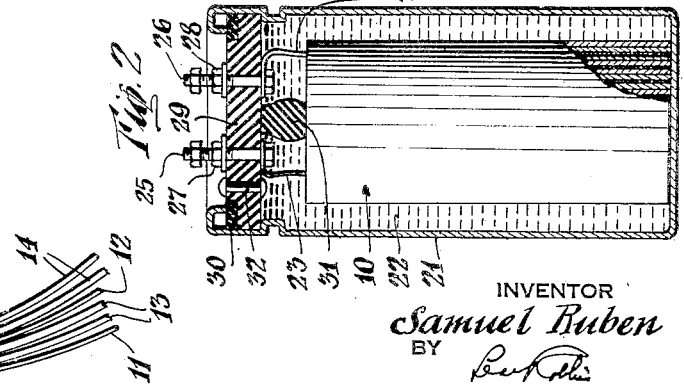

2,266,814

UNITED STATES PATENT OFFICE 2,266,814

DIELECTRIC COMPOSITION

Samuel Ruben, New Rochelle, N. Y.

Application March 19, 1940, Serial No. 324,779

8 Claims. (Cl. 252—66)

This invention relates to dielectric compositions which may be in liquid or solid form.

The general object of the invention is the provision of a dielectric which is stable and which possesses a high dielectric constant.

A further object is the provision of an improved ethyl chlorobenzene composition suitable for use as a dielectric for electrostatic condensers and for electrical apparatus, such as cables, transformers, etc.

Other objects will be apparent as the disclosure proceeds and from the drawing in which:

Fig. 1 is an end view of a partly assembled condenser;

Fig. 2 is a section through a completed condenser; and

Fig. 3 is a graph containing groups of curves showing power factor-temperature characteristics of condensers of this invention.

I have made condensers employing mixtures of ethyl pentachlorobenzene and ethyl tetrachlorobenzene and find that this mixture possesses characteristics which are of advantage as a condenser dielectric. However, I have also found that it possesses disadvantageous characteristics. For instance, it is unstable, the instability manifesting itself in the precipitation and separation of the solid ethyl pentachlorobenzene from the liquid ethyl tetrachlorobenzene when cold, the rapid rise in power factor of the condenser with heat, and in the permanent variations in capacity, power factor and resistivity with time and temperature.

I have found that by adding to the mixture of these two compounds a resin which is soluble in each compound, that a stable composition is obtained which is homogeneous throughout wide temperature ranges and which, under normal operating conditions, will maintain constant desirable electrical characteristics. For instance, a solution of 50% ethyl pentachlorobenzene and 50% ethyl tetra chlorobenzene will show precipitation at temperatures in the order of 5° C.; whereas, when a small amount of soluble resin is added, the temperature can be lowered to as much as −10° C. without precipitation. In addition, the electrical characteristics are improved as is apparent on the power factor-temperature curves shown on the drawing. I have found that the addition of the resin will, especially in the higher proportions, prevent crystallization of the mixture which normally occurs at low temperatures and which results in wide capacity and power factor changes.

While there is a wide choice of resins which may be utilized, it is essential that the resin selected be one which is soluble with heat in both the ethyl tetra and ethyl pentachlorobenzene and which will remain in solution with either or both of these compounds when cool. The resin selected should be one having good electrical characteristics. For example, wood rosin is soluble in both penta and tetrachloride, yet it is not as desirable as hydrogenated wood rosin, which is much more stable under operating conditions and possesses inherently superior electrical characteristics. This also applies to coumarone indene resins; for electrical purposes the hydrogenated coumarone indene is preferable to and possesses better power factor-temperature characteristics than the unhydrogenated coumarone indene resins. The latter, however, particularly when produced by a heat polymerization method, is suitable for combining with the mixture of ethyl penta and tetra chlorobenzene when a low power factor at abnormally high temperatures is not required. The hydrocarbon resins of the hydrogenated type, such as the tetramer of dihydronaphthalene, cyclopentadiene resins and hydrogenated turpentine resins, are also suitable for the purposes of this invention. As previously mentioned, however, the resin selected must be one which is mutually soluble in both ethyl penta and tetrachlorobenzene and which will insure a homogeneous composition under condenser operating conditions. The proportions of ethyl tetra and penta chlorobenzene used may be varied over wide limits. Generally a mixture of substantially equal proportions is desirable for the purposes of this invention, although it is possible to use a larger proportion of either of these compounds. It is desirable, however, that the lower percentage of either compound be not substantially less than 30%. The amount of resin to be added to the mixture will depend upon the operating conditions to which the condenser will be subjected and the power factor capacitance and resistivity conditions desired. For example, the resin may be added in proportions from approximately 5% to approximately 70%; where a liquid dielectric is desired, the preferred proportion of added resin will be in the order of 20% to 30%; where a solid dielectric is desired, the preferred proportion of resin added will be from 35% to 45%. When the resin is added to the ethyl chlorobenzene mixture, the resistivity of the solution rises. For example, the resistivity of the ethyl chlorobenzene mixture alone, when used in a condenser, was 360 megohms per mfd.; with 20 hydrogenated coumarone indene added, the resistivity was 1200 megohms per mfd.; with 30% hydrogenated coumarone indene added, the resistivity was 2200 megohms per mfd.; and with 60% of the added resin, the resistivity was 12,000 megohms per mfd. at 25° C.

In the accompanying curves, Fig. 3, is shown the power factor-temperature characteristics of wound foil type electrostatic condensers constructed with linen paper, kraft paper and regenerated cellulose film separators, impregnated with compositions of ethyl chlorobenzene (consisting of equal proportions of ethyl tetrachlorobenzene and ethyl pentachlorobenzene) with various percentages of hydrogenated coumarone indene resin.

As will be observed from Fig. 3, the shape of the power factor-temperature curve is dependent upon the relation between the percentage of ethyl chlorobenzene and resin.

Fig. 1 and Fig. 2 illustrate the type of condenser from the operation of which curves in Fig. 3 were plotted. Fig. 1 is an end view of a condenser, section 10, comprising two foil electrodes 11 and 12 of aluminum or other suitable metallic foil wound together with double spacers 13 and 14 of kraft paper.

Fig. 2 shows a completed capacitor embodying condenser section 10, illustrated in Fig. 2, mounted within aluminum container 21 and impregnated with, and immersed in, a composition 22 of 70% of an equal mixture of ethyl penta and tetrachlorobenzene and 30% hydrogenated coumarone indene resin. The leads 23 and 24 are soldered to terminals 25 and 26 and extend through top 29. Soft chlorinated rubber plug 31 holds the condenser section in place. The top of the condenser is spun over against chlorinated rubber washer 30 in order to afford a tight seal. The condenser may be filled with the dielectric through the hole sealed by plug 32.

The compositions of this invention, especially in the solid form, are useful for impregnating, sealing and moisture-proofing purposes, in addition to their application as dielectrics. For instance, as a moisture-proof impregnant for cardboard tubes or as a seal, I have found it advantageous to use a composition made up of 80% unhydrogenated coumarone indene and 20% of an equal mixture of ethyl penta and tetrachlorobenzene. The other resins, such as wood resins and hydrogenated resins, can also be used, but the particular composition given can be produced at a low cost with high quality.

This application is a continuation in part of my co-pending application, Serial No. 307,199, filed December 2, 1939, for Electrostatic condenser and dielectric therefor.

What is claimed is:

1. A dielectric comprising a mixture of ethyl penta and tetrachlorobenzene and a resin soluble therein, said dielectric being more stable and possessing less tendency to separate than the mixture of ethyl penta and tetrachlorobenzene without said resin.

2. The dielectric as described in claim 1 characterized in that the resin comprises an hydrogenated resin.

3. The dielectric as described in claim 1 characterized in that the resin comprises the coumarone indene resin.

4. A dielectric as described in claim 1 characterized in that the resin comprises an hydrogenated tree resin.

5. A stable composition comprising a mixture of ethyl tetra and pentachlorobenzene combined with a dielectric resin soluble therein.

6. A dielectric for electrostatic condensers and the like comprising approximately 30% to 95% mixture of ethyl penta and tetrachlorobenzene and approximately 5% to 70% of a dielectric resin soluble therein.

7. A dielectric comprising a composition of ethyl pentachlorobenzene, ethyl tetrachlorobenzene and coumarone indene resin.

8. A dielectric comprising a composition of ethyl pentachlorobenzene, ethyl tetrachlorobenzene and heat polymerized coumarone indene resin.

SAMUEL RUBEN.